Patented Dec. 16, 1924.

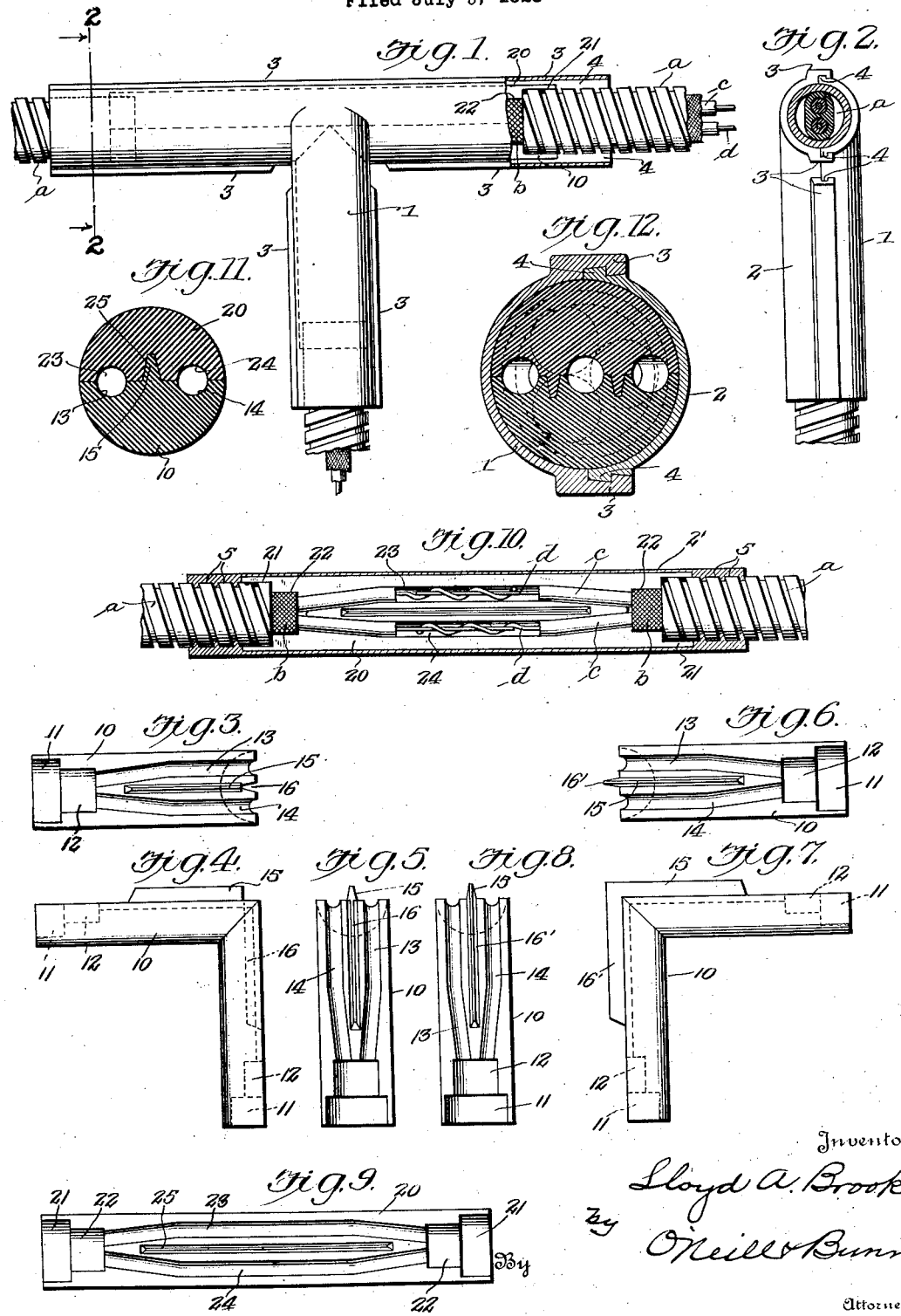

1,519,108

UNITED STATES PATENT OFFICE.

LLOYD A. BROOKE, OF LANDOVER, MARYLAND

COUPLING FOR ARMORED CABLES.

Application filed July 5, 1923. Serial No. 649,572.

*To all whom it may concern:*

Be it known that I, LLOYD A. BROOKE, a citizen of the United States, residing at Landover, county of Prince Georges, State of Maryland, have invented certain new and useful Improvements in Couplings for Armored Cables; and I do hereby declare the following to be a full, clear, and exact description of the invention, such as will enable others skilled in the art to which it appertains to make and use the same.

The invention has for its object to provide a simple and effective coupling for joining the ends of armored cables, the coupling in itself comprising longitudinally interlocking and mating armor sections, preferably in the form of half tubes, having interlocking hook flanges along their meeting edges and their portions provided with interior helical threads to engage the corresponding convolutions of the cable armor, and complementary insulating blocks fitting within the mating armor sections, said blocks being provided with mating grooves to form wire-receiving conduits and interlocking tongue and groove connections between the sections, said insulating blocks also preferably having chambered or recessed end portions to receive the ends of the cable armor and insulation, and opening into the wire-receiving grooves.

Typical applications of the invention are illustrated in the accompanying drawing, in which:

Fig. 1 is a side elevation of a T-coupling;

Fig. 2 is an end view partly in section of the same, the section being taken on line 2—2 of Fig. 1;

Fig. 3 is a plan view of an insulating block section;

Fig. 4 is a side elevation thereof;

Fig. 5 is an end elevation;

Figs. 6, 7 and 8 are views corresponding to those in Figs. 3, 4 and 5 of the mating block section;

Fig. 9 is a bottom plan view of a female insulating section, employed in connection with a T-coupling or with a straight coupling;

Fig. 10 is a longitudinal section of a straight coupling connecting two wire armored cables;

Fig. 11 is a transverse sectional elevation of the insulating blocks for a two-wire coupling;

Fig. 12 is a transverse sectional elevation of a three-wire coupling.

Referring to the drawings, 1 and 2 indicate the armor sections of the coupling, each section being formed as a half tube, the longitudinal edges of which are provided with interlocking hook flanges which are adapted to be snapped or forced together when the sections are assembled. In the embodiment of the invention as illustrated in Figs. 1 and 2, the coupling is of the T-type, adapted to connect a lateral branch to a two-wire armored cable in which the armor of the cable is in the form of helical convolutions of metal, as shown. The T-shaped armor section 1 is provided with a longitudinal hook-like flange 4 along each longitudinal edge of the half tube members of the leg and head of the T, and correspondingly, the longitudinal edges of the member 2 are provided with hook flanges 3, which are adapted to be either snapped over or forced over the shoulders of the flanges 4 to form a secure interlocking joint or series of joints between the armor sections. Preferably, the interlocking faces of the hook flanges 3 and 4 are beveled, as more particularly illustrated in Fig. 12, to facilitate the engagement of the flanges by lateral pressure applied to opposite sides of the armor sections. The ends of each of the armor sections of the coupling are provided with re-entrant flanges that are helically grooved to mesh with the convolutions on the cable armor so that, when the armor sections of the coupling are forced together in interlocking engagement, they will be simultaneously interlocked with the armor of the cable, as more particularly illustrated in Fig. 10, in which the grooves formed in the ends of the coupling sections are indicated at 5. It will be understood, of course, that, if the convolutions of the armor on the cable are of a different form than that indicated, the grooves in the ends of the coupling section will be given the proper complementary form or contour to properly register with the cable armor.

Each complete coupling is provided with sectional insulating blocks adapted to substantially fill the interior of the coupling and to provide recesses and channels to receive the ends of the cable armor, the ends of the intermediate cable insulation, and the conducting wires, and retain these elements firmly interlocked against displacement. The insulating members of a T-coupling are three in number and are illustrated in detail in Figs. 3 to 9. Figs. 3, 4 and 5 illustrate one insulating section 10, which is generally rectangular in contour and substantially semi-cylindrical in both of its legs. Each end of the angular member 10 is provided with a semi-cylindrical recess 11, adapted to receive the severed end of the cable armor, and a communicating recess 12 of smaller diameter to receive the slightly extended end of the cable insulation, said recess 12 opening into two longitudinal channels 13 and 14, which extend along both faces of the angular member 10. Between the grooves 13 and 14 on the horizontal leg of the member 10 is formed a projecting tongue 15, and between the grooves on the vertical leg of the member 10 is formed a groove 16. The mating L-shaped insulating member shown in Figs. 6, 7 and 8 is in all essentials similar to that shown in Figs. 3, 4 and 5, the only difference being the provision of a tongue 16' on the vertical leg of the member 10, which tongue engages the groove 16 in the mating member. To complete the sectional insulation assembly for the T-coupling, there is provided a third member, illustrated in Fig. 9, which consists of a substantially semi-cylindrical block 20 provided with end recesses 21, 21 and 22, 22, corresponding to the recesses 11 and 12 in the L-shaped sections 10, which are connected by two grooves or channels 23 and 24, which mate with the grooves 13 and 14 in the members 10 and constitute conduits for the wires of the cable. Between the grooves 23 and 24 there is formed an additional groove 25, which engages the tongues 15 on the members 10.

To effect a T-coupling, the cable armor is removed for a distance somewhat less than the length of the head of the coupling armor and the insulation below the cable armor is removed for a somewhat less distance to leave short lengths of the insulation projecting beyond the armor, and the final insulation for the wires is removed adjacent the point where the wires are to be joined. The armor on the cable section to be coupled with that just referred to is similarly removed, so as to allow the end of the armor to project slightly within and fill the chamber formed by the mating recesses 11 in the lower ends of the insulating blocks 10, and similarly, the intermediate insulation is severed so as to permit the same to project beyond the armor to an extent to fill the chamber formed by the mating recesses 12 with the individual wires occupying the conduits formed by the mating grooves 13 and 14 in said members 10. The ends of the wires of this cable section are then twisted about the wires of the other cable and preferably soldered together. The proper points for severing the armor and the intermediate insulation on the respective cable sections may be accurately determined by placing the respective cable sections in one-half of the casing or armor section of the coupling, being sure that the convolutions on the cable armor engage the helical grooves in the respective ends of the coupling section. After the wires of the respective cables are appropriately joined and secured by soldering, the connected cables are removed from the half section of the coupling armor and the insulating blocks are then assembled about the joined cables with the joined wires occupying the conduits formed by the mating grooves in the insulating blocks, the cable armor ends projecting into the chambers formed in the ends of the insulating blocks, and the intermediate cable insulation sections occupying the intermediate recesses in the insulation blocks. The armor sections of the coupling are then placed in position on either side of the assembled insulating blocks, with the helical grooves in the open ends of the armor sections of the coupling in registry with the convolutions of the cable armor, and the two halves of the coupling armor are interlocked by forcing the flanges 3 and 4 thereon into engagement with each other, either by pressure, or if necessary, by hammer blows. If the armor sections of the coupling are formed of metal or like material, as by drop forging, they will possess sufficient inherent resiliency to permit the parts to be snapped together by pressure on opposite sides and when so interlocked will resist any ordinary stresses which would tend to separate them. When thus assembled and completed, the casing or armor sections of the coupling are substantially rigidly connected to the armor of the cable sections and relieve the wires of all strain at the joint, so that the danger of disrupting the latter is practically eliminated. Furthermore, any movement of the wires within the coupling is prevented, and the individual wires are effectively separated from each other and the possibility of a short-circuit occurring minimized by reason of the close contact between the engaging surfaces of the insulating blocks, and more particularly by reason of the tongue and groove interlock between the several insulating blocks.

Obviously, if a cross connection is to be made with four branches, the armor sections of the coupling will be given the appropriate cross form and two sets of similar L-shaped insulating blocks or members will be provided to fit the interior of the armor coupling, the insulating blocks being provided with appropriately formed mating tongues and grooves to effect the desired interlock between these members.

In applying a straight coupling between the ends of armored cable, the particular form of the invention illustrated in Fig. 10 is employed, the same involving two mating armor or casing sections, formed as half tubes, one of which 2' is illustrated, each provided with the interlocking marginal flanges, similar to those shown at 3 and 4 in Figs. 1 and 2, the ends of the armor sections being provided with helical grooves 5 to receive and interlock with the convolutions of the cable armor, each half of the coupling armor being adapted to receive an insulating block, one of which may be identical with that shown in Fig. 9, comprising a cylindrical body 20 with recesses 21 and 22 in each end connected by longitudinally spaced grooves 23 and 24 and an intermediate groove 25. The mating insulating section is preferably similar to that shown in Fig. 9, except that it is provided with a tongue which meshes with the groove 25.

In applying this type of coupling to join the ends of two armored cables, the ends of the respective cables are prepared as illustrated in Fig. 10, the bared ends of the wires being twisted together and united by solder and the wires laid in the grooves 23 and 24 of the insulating section 20, with the respective ends b of the intermediate insulation occupying the inner recesses 22 in the insulating block and the inner ends of the cable armor occupying the corresponding recesses 21. The grooves 5 in the respective ends of the armor sections of the coupling engage the convolutions on the armor cable, as illustrated, so that, when the two sections of the coupling armor are interlocked by the engagement of the hook flanges thereon, the ends of the cables are coupled rigidly together and all strains on the wires d, d are relieved. It will be noted that the bared portions of the wire are separated by the entire body of the insulation between the grooves in which the wires rest, and also by the tongue and groove connection between the sections of the insulation.

It will be apparent that the same type of coupling may be employed in connection with multiple wire cables, and Fig. 12 illustrates the adaptation of the coupling to a three-wire cable, in which case the insulating blocks are provided with two sets of interlocking tongues and grooves running longitudinally, with a conduit for the third wire between the tongue and groove connections. From the foregoing explanation, it will be apparent that a coupling constructed and applied in accordance with the invention possesses many advantages over the types heretofore in use, in that it insures a higher degree of insulation at the joints between the wires, completely eliminates all tension and external stresses on the wires which might tend to rupture the joint, and enables the joint to be effected with a minimum loss of the armored cable. By forming the armor sections or housing members of the coupling of suitable metal and casting the insulating sections of a proper material, it will be apparent that the coupling may be formed in standard sizes to fit any sizes of cable, and that the coupling may be effected at a minimum of labor and expense with the assurance that the joint at the coupling will possess practically the same inherent strength as the cable, so that danger of rupture at the joint is practically eliminated.

What I claim is:

1. A coupling for armored cables comprising longitudinally interlocking mating armor sections having end portions meshing with the cable armor, and complementary insulating blocks fitting within the mating armor sections, said blocks having mating grooves to form wire-receiving conduits and mating tongue and groove connections between said sections.

2. A coupling for armored cables comprising longitudinally interlocking mating armor sections having internally threaded end portions meshing with the helical convolutions of the cable armor, and complementary insulating blocks fitting within the mating armor sections, said blocks having mating grooves to form wire-receiving conduits and mating tongue and groove connections between said sections.

3. A coupling for armored cables comprising half tubular armor sections having interlocking hook flanges along their meeting edges and internally threaded end portions meshing with the helical convolutions of the cable armor, and complementary insulating blocks fitting within the mating armor sections, said blocks having mating grooves to form wire-receiving conduits and mating tongue and groove connections between said sections.

4. A coupling for armored cables comprising half tubular armor sections having interlocking hook flanges along their meeting edges and internally threaded end portions meshing with the helical convolutions of the cable armor, and complementary insulating blocks fitting within the mating armor sections, said blocks having chambered ends to receive the ends of the cable armor and insulation and mating tongue and groove connections between said sections.

In testimony whereof I affix my signature.

LLOYD A. BROOKE.